United States Patent Office 3,117,687
Patented Jan. 14, 1964

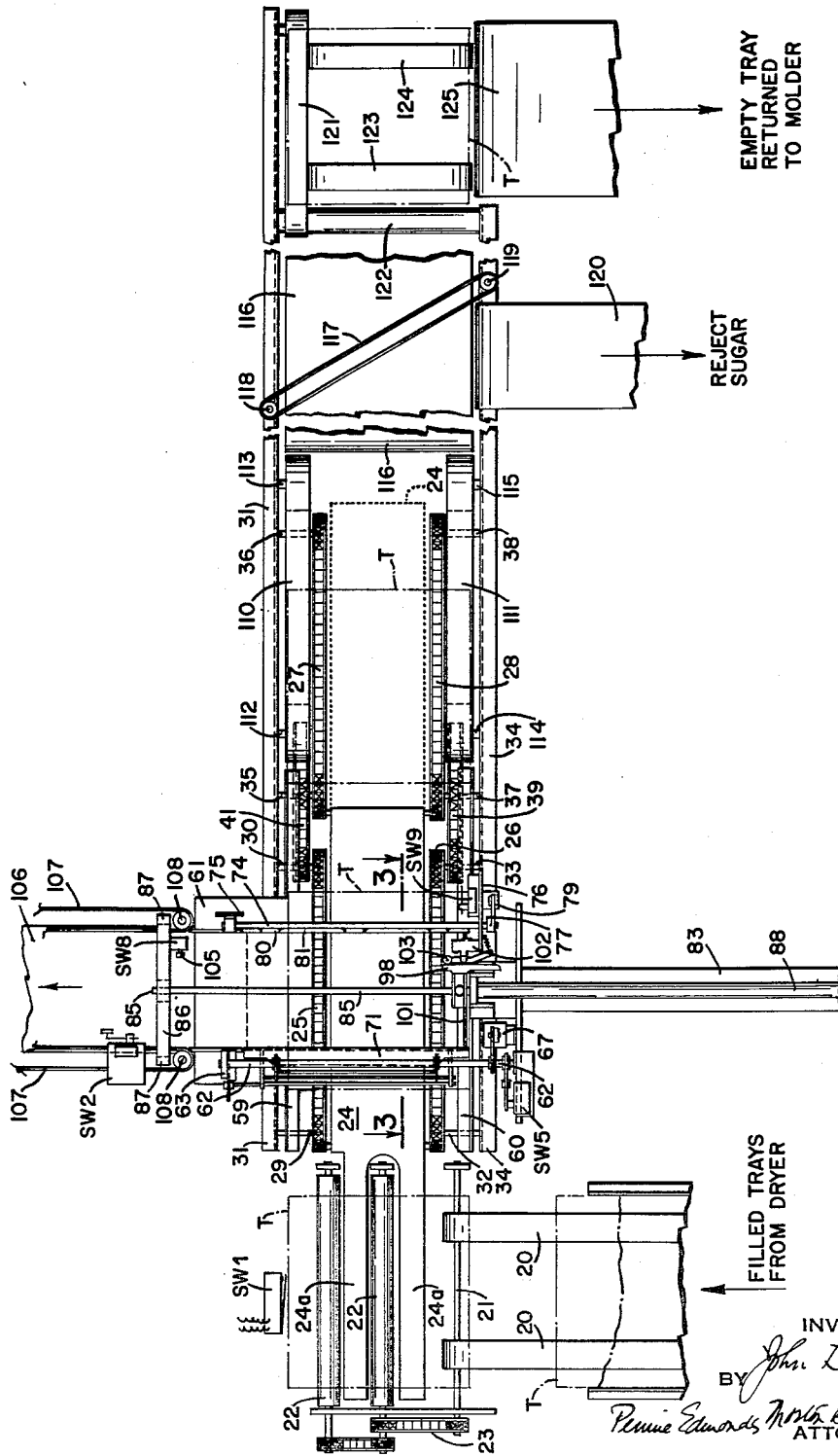

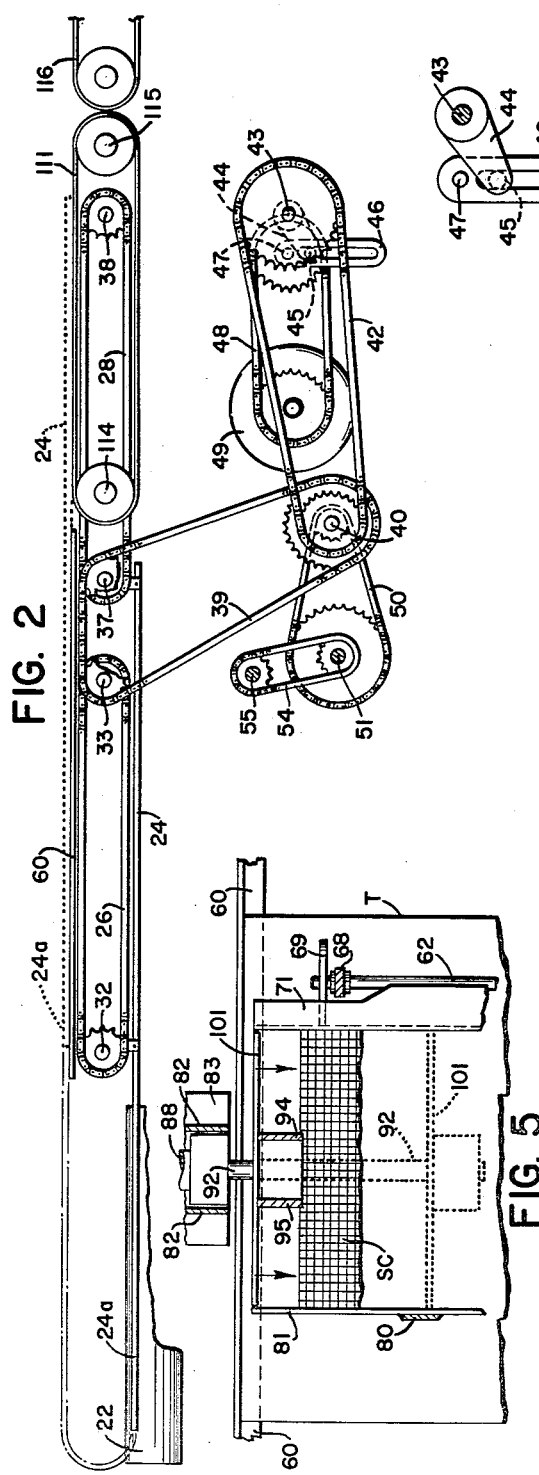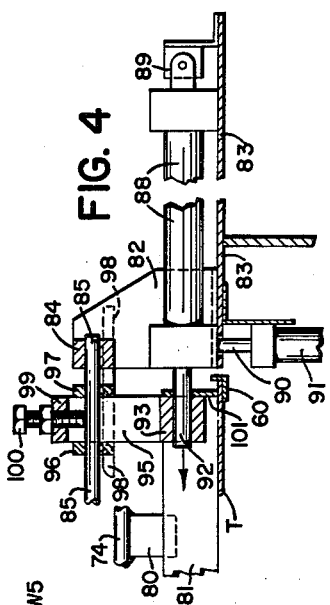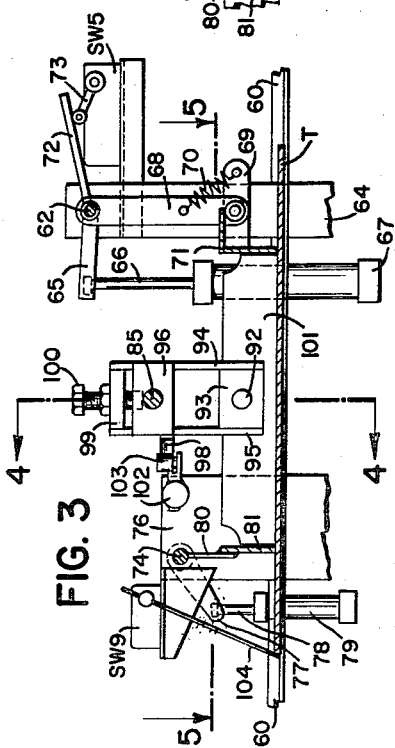

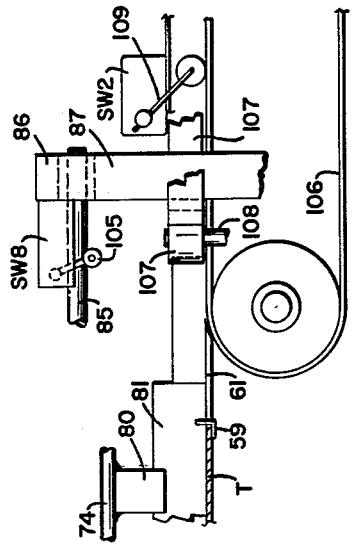
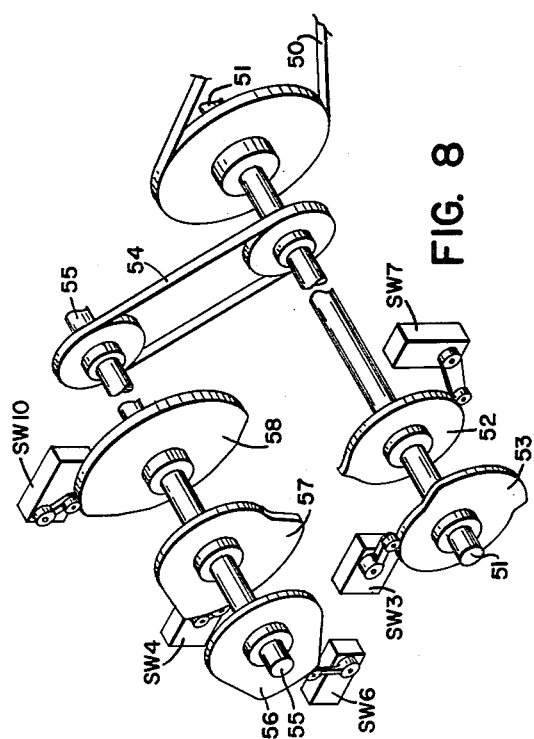
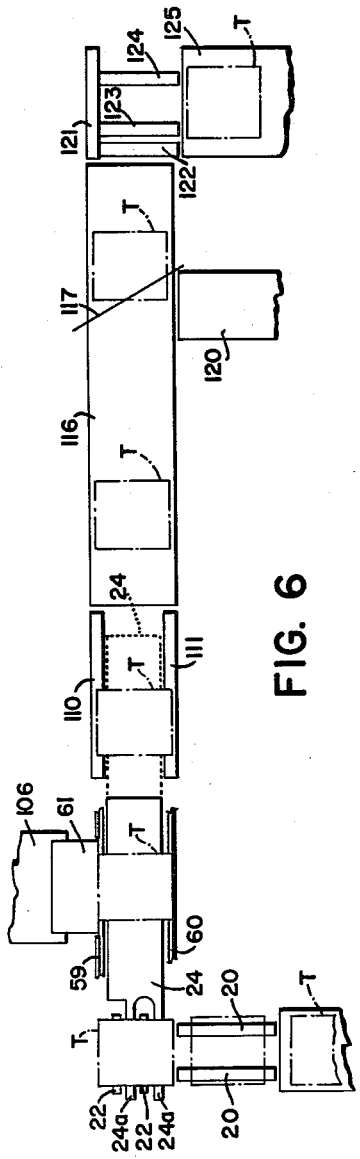

3,117,687
CONVEYING SYSTEM
John L. Dix, Baltimore, Md., assignor to American Sugar Company, a corporation of New Jersey
Filed Aug. 3, 1961, Ser. No. 129,032
16 Claims. (Cl. 214—310)

This invention relates to conveying systems of the automatic type and is concerned more particularly with a novel system for transporting a series of arrays of articles on carriers from a source, removing the arrays from the carriers and advancing the arrays without disarranging them to a delivery point, and returning the carriers for further use. The new system is especially desirable for the transport of articles arranged to facilitate their further disposition, for example, by loading them into cartons, and a typical use of the system is for the conveyance of sugar cubes from a dryer to a cartoning machine. Since all the advantages of the invention are realized in its application to the handling of sugar cubes, a form of the system suitable for that purpose will be illustrated and described in detail to make clear the principles involved.

In the production and packing of sugar cubes, the moist sugar is deposited in cube form by molding apparatus on trays, each of which carries a group of cubes in an array of a shape selected to facilitate the packing of the cubes in cartons by machine. The loaded trays are advanced to a dryer and, before the trays start through the dryer, the arrays of cubes carried by the trays are made more compact. The trays are moved through the dryer to dry the cubes and, on issuance from the dryer, are transported by a conveyor forming part of the system of the invention to a transfer station, where the cubes are removed from each tray without change in their arrangement and delivered to a conveyor transporting them to a carton loading machine. The empty trays are delivered from the transfer station to a conveyor for returning them for further use.

For a better understanding of the invention, reference may be made to the accompanying drawings, in which FIG. 1 is a plan view with parts broken away of a conveying system embodying the invention;

FIG. 2 is a diagrammatic side elevational view showing the drive for part of the system;

FIG. 2a is a fragmentary elevational view showing parts in FIG. 2 on an enlarged scale;

FIG. 3 is a sectional view on the line 3—3 of FIG. 1;

FIGS. 4 and 5 are sectional views on the lines 4—4 and 5—5, respectively, of FIG. 3;

FIG. 6 is a diagrammatic plan view showing the course of a carrier on the conveying system;

FIG. 7 is a fragmentary side elevational view of parts of the article conveyor; and FIG. 8 is a diagrammatic perspective view of switches controlling the system and the cams for operating the switches.

The conveying system illustrated in the drawings is employed for conveying carriers loaded with sugar cubes to a transfer station where the cubes are removed from the carriers and delivered to a conveyor, which transports them to a delivery point where there may be a machine for introducing the cubes into the cartons. The empty carriers are removed from the transfer station and returned to the cube molding apparatus for receiving another load of cubes.

The carriers are in the form of flat trays T and each one carries an array of cubes in rectangular formation. The trays coming from the dryer are carried by a conveyor made up of a pair of belts 20 trained about pulleys on a driven shaft 21. Beyond the belts is a transfer station formed by a pair of rolls 22, which lie with their axes parallel and transverse to the direction of movement of the belts. The rolls are mounted with their tops in the plane of the upper stretches of the belts and they are driven from shaft 21 by chain connections 23. As a tray leaves the belts, it rests upon and is advanced by the rolls, until it closes a switch SW1 for a purpose to be described.

The trays on the rolls 22 are removed therefrom by a transfer member 24 in the form of a plate formed at one end with spaced legs 24a and, in one position of the plate, one of the legs lies between the belts 20 and the adjacent roll 22, while the other lies between the rolls 22. The plate is given a four-way movement and, for this purpose, is mounted on pins attached to pairs of chains 25, 26, and 27, 28. The chain 25 is mounted on sprocket wheels on stub shafts 29, 30 mounted in bearings on a horizontal member 31 on the frame of the machine and the chain 26 is similarly trained about sprocket wheels on stub shafts 32, 33 in bearings on a frame member 34. The chain 27 is trained about sprocket wheels on stub shafts 35, 36 in bearings on the frame member 31 and chain 28 is trained about sprocket wheels on stub shafts 37, 38 in bearings on the frame member 34.

The shafts 33 and 37 are connected by a chain 39 to a shaft 40 (FIG. 2) and the shafts 30 and 35 are similarly connected to the shaft 40 by a chain 41. The shaft 40 is connected by a chain 42 to a shaft 43 carrying an arm 44 having a pin 45 running in a slot in an arm 46 on shaft 47 connected by a chain 48 to the shaft of a motor 49. With this arrangement, the speed of shaft 43 and the parts driven thereby varies harmonically from a minimum to a maximum and back during each revolution of the shaft 47. The shaft 40 is connected by a chain 50 to a shaft 51 carying cams 52, 53 (FIG. 8) and the shaft 51 is connected by a chain 54 to a shaft 55 carrying cams 56, 57, and 58.

In the operation of the system, the conveyor made up of the belts 20 operates intermittently and, at a time when a tray T is deposited by the belts on the rolls 22, the plate 24 lies at a level below the tops of the rolls, and in its extreme position at the left, as shown in FIG. 1. When the tray closes the switch SW1, the motor 49 starts to advance the chains 25, 26, 27, and 28 carrying the plate 24 and, in the first part of the movement of the plate 24 with the chains, the plate rises to lift the tray T from the rollers 22 and then carries the plate to the right as seen in FIGS. 1 and 6. When the plate has been moved through the top stretch of the chains and begins to travel downwardly to the lower stretch, the tray is deposited at a transfer station, where it comes to rest on a pair of angle iron supports 59, 60 attached to the framework of the machine.

At the transfer station, the vertical flange of the support 59 is cut away and a plate 61 is mounted to extend laterally from the support with its top in the plane of a tray at the transfer station. A shaft 62 is mounted in suitable standards 63, 64 to extend across the plate 24 and the shaft carries an arm 65 (FIG. 3) attached to the piston rod 66 of a pneumatic cylinder 67. A pair of arms 68 attached rigidly to the shaft 63 extend downwardly therefrom and an arm 69 is pivotally mounted on the lower end of each arm 68 and has one end connected to the arm 68 by a spring 70. The other end of each arm 69 carries an angle iron 71 extending across the space between the supports 59, 60 and having a vertical flange acting as a guide for an array of cubes to be moved from a tray at the transfer station and the mounting of the guide as described causes it to move into contact with a side of the array with a yielding action. The shaft 62 also carries an arm 72, which engages the actuating arm 73 of a normally open switch SW5 and closes the switch when the shaft 62 has been swung so that the arms 68 extend downward vertically therefrom.

A shaft 74 (FIG. 3) mounted in suitable standards 75, 76 extends parallel to the shaft 62 and has an arm 77 connected to the piston rod 78 of a pneumatic cylinder 79. Arms 80 rigidly attached to the shaft 74 extend downwardly therefrom and carry a plate 81, which acts as a guide.

A pair of parallel plates 82 (FIGS. 4 and 5) are mounted adjacent to the transfer station on a plate 83 attached to the framework of the machine and extend transverse to the direction of movement of the plate 24. The plates are connected at their top by a block 84, in which is attached one end of a guide rod 85. The rod extends across the plates 24 and 61 and its other end is mounted in a cross-bar 86 (FIG. 1) attached to standards 87 rising from the frame structure. A pneumatic cylinder 88 is pivotally mounted at one end on a bracket 89 (FIG. 4) attached to the plate 83 and the other end of the cylinder lies between the plates 82 and is engaged by the upper end of the piston 90 of a vertical pneumatic cylinder 91. The piston rod 92 of the cylinder 88 is mounted in a block 93 disposed between a pair of plates 94, 95. The plates 94, 95 lie between a pair of plates 96, 97 which encircle the guide rod 85 and are attached at their edges to a bar 98, the outer surface of which acts as a cam. The plates 94, 95 are connected at their top by a cross piece 99, through which an adjusting screw 100 is threaded to bear on the top of the guide rod 85. A pusher plate 101 is attached to the block 93 and, when the guides 71, 81 are in effective position as shown in FIG. 3, the ends of the pusher lies close to the opposed faces of the guides.

An air valve 102 with an operating arm 103 is mounted on the framework above the pusher 101 with the operating arm engaging the cam 98. As the pusher is moved by the cylinder 88, the cam controls the admission of air into the cylinder, so that the pusher 101 moves slowly at the start of its outward stroke and at the end of its inward stroke.

The supply of air to the cylinder 79 (FIG. 3), by which the guide 81 is swung into and out of operative position, is controlled by a normally open switch SW3 (FIG. 8), which is closed once for each cycle of movement of the plate 24 by a cam 53 on the shaft 51. The operation of cylinder 67 (FIG. 3), by which the guide 71 is moved into and out of operative position, is controlled by a normally open switch SW4 (FIG. 8) closed once per cycle of movement of the plate 24 by a cam 57. A normally open switch SW9 (FIG. 3) is mounted on the framework adjacent to the guide 81 and has an operating arm 104 engageable by a tray T at the transfer station to close the switch. If the switch SW4 is closed at a time when switch SW9 has not been actuated by a tray, the closing of switch SW4 does not cause the cylinder 67 to move the guides 71 toward operative position.

A normally open switch SW6 (FIG. 8), which is closed by the cam 56 once per cycle of movement of the plate 24, controls the supply of air to cylinder 88 to cause outward movement of the piston rod and move the pusher plate 101 across the top of a tray T at the transfer station. However, if the array of cubes on the tray at the transfer station is disarranged to such an extent that the engagement of the guide 71 with the disarranged cubes prevents the shaft 62 from being swung to cause the arm 72 to close the switch SW5, the closing of switch SW6 will be ineffective to start the outward movement of the pusher plate.

A switch SW8 (FIG. 1) mounted on the cross-bar 86 has an operating arm 105 engageable by the cam 98 when the pusher plate 101 has reached the outer limit of its travel. Closing of switch SW8 reverses the supply of air to the cylinder 88 to cause the return of the pusher plate to its initial position.

A conveyor belt 106 extends outwardly from the plate 61 and receives the arrays of cubes pushed successively from the trays at the transfer station and across the plate 61. The belt carries the arrays to a delivery point, at which there may be a carton packing machine, and, in their movement on the belt, the arrays are held in place by a pair of driven belts 107 mounted on pulleys on vertical shafts 108 on opposite sides of the belt 106.

A normally closed switch SW2 (FIGS. 1 and 7) is mounted at one side of the belt 106 and has an operating arm 109 carrying a roller resting on the belt, so that sugar cubes passing beneath the roller open the switch. The switch is in series with the switches SW5 and SW6 and, if switch SW2 is opened by sugar cubes, the closing of switches SW5 and SW6 cannot start the cylinder 88 to move the pusher plate outwardly.

The chains 27, 28 (FIG. 1) lie between a pair of conveyor belts 110, 111 forming part of a tray return conveyor. The belt 110 is trained about pulleys on stub shafts 112, 113 in bearings on the frame member 31, while the belt 111 is similarly trained about pulleys on stub shafts 114, 115 in bearings on the frame member 34. The belts 110, 111 are connected to be driven in unison with a conveyor 116 beyond the belts. A belt 117 trained about pulleys on vertical shafts 118, 119 extends across the belt 116 at an angle and acts as a plow to remove sugar cubes from trays on the belt 116. Cubes so removed from the belt 116 by the belt 117 are carried away on a conveyor belt 120.

Beyond the end of belt 116, a narrow belt 121 is trained about a roll 122 and extends in the same direction as the belt 116 and in line with one edge thereof. A pair of upwardly inclined belts 123, 124 extend from beneath the belt 121 to an upwardly inclined belt 125. As an empty tray passes off the belt 116, it is advanced by the roll 122 with one edge supported by the belt 121, until the tray overbalances and it drops down on the belts 123, 124. These belts transfer the tray to the belt 125, by which it is returned to the sugar cube molder.

In the operation of the conveying system, the trays loaded at the cube molder with sugar cubes SC in an oblong array, as shown in FIG. 5, are delivered successively from the dryer to the pick-up station by the belts 20 and deposited on the rolls 22. As each tray is advanced by the rolls, it closes the switch SW1 and starts the motor 49. Through the harmonic drive, the chains 25, 26 and 27, 28 first raise the plate 24 slowly to pick up the tray from the rollers 22 and then advance the tray in its plane and deposit it slowly on the supports 59, 60 at the transfer station. The cams 53, 57 then closes the normally open switches SW3 and SW4, respectively.

The closing of switch SW3 causes the cylinder 79 to swing the guide 81 from an initial horizontal position to the vertical position shown in FIG. 3, in which the guide is in contact with one edge of the array of sugar cubes SC on the tray. The movement of the tray T to the transfer station has caused a movement of arm 104 to close switch SW9 in circuit with the switch SW4 and the closing of switch SW4 by its cam 57 causes the cylinder 67 to swing the shaft 62 to move the guide 71 into position against the side of the array of sugar cubes SC opposite to that engaged by the guide 81. If the guide 71 can be moved to final position, in which the arms 68 lie vertically, the arm 72 on the shaft 62 closes the switch SW5. If, at this same time, the arm 109 of switch SW2 has not been raised to open the switch by sugar cubes lying beneath the arm, the closing of switch SW6 by its cam 56 causes air to be admitted to the cylinder 88 by valve 102 so that the piston rod is moved out of the cylinder. In such movement, the pusher plate 101 engages the side of the array of cubes between the guides 81 and 71 and moves the cubes off the tray, across the plate 61, and upon the conveyor belt 106, by which the cubes are carried to the cartoning machine. When the pusher has reached the outer limit of its movement, it opens the normally closed switch SW8, which reverses the valve 102 and causes the cylinder 88 to retract the piston rod 92 and the pusher plate to their initial positions. At the same time, the switches SW3 and SW4 are opened and the cylinders 67, 79 move the guides 71, 81 to inoperative positions at a distance above the tray T at the transfer station. In the initial part of the outward movement of the pusher and the final part of its inward movement, the cam plate 98 adjusts the air valve 102 to slow down the movement of the pusher.

When the plate 24 has been returned by its supporting chains to its initial position with its legs adjacent to the rolls 22 and below the tops thereof, the normally closed switch SW7 is opened by its cam 52 and, if, at this time, a loaded tray T has not been deposited upon the rolls and closed the switch SW1, the motor 49 is stopped. If the switch SW1 has been closed by a tray before the switch SW7 is opened, the motor continues to operate and the continued movement of the chains cause the plate 24 to rise and then to be advanced at its higher level. In such movement, the plate 24 picks up a loaded tray from the pick-up station and the empty tray from the transfer station, and advances to deposit the loaded tray at the transfer station and the empty tray on the belts 110, 111. Before the plate 24 reaches its upper level, the guides 71, 81 have been swung upward and normally open switch SW10 has been closed by cam 58 to admit air into cylinder 91 (FIG. 4) to raise the pusher structure. The unloading of the array of sugar cubes from the loaded tray at the transfer station is carried out as above described, while the empty tray is advanced by the belts 110, 111 to the belt 116 and is finally delivered by the belts 123, 124 to the return conveyor 125.

If a loaded tray is deposited at the transfer station at a time when sugar cubes on the conveyor 106 have raised the arm 109 of switch SW2 to open that switch, the closing of switch SW6 by its cam will not start the pusher and the cubes will not be transferred from the tray. Upon the next movement of the plate 24 by its chains, the plate will pick up loaded trays from the pick-up and transfer stations and one tray will then be deposited at the transfer station and the other upon the belts 110, 111. When the tray on the belts is passed to the belt 116 and is moved beneath the plow belt 117, the sugar cubes on the tray will be moved off the tray and deposited upon the conveyor 120, while the tray will proceed beneath the belt 117 and eventually be deposited on the return conveyor 125.

In the conveying system described, the length of the horizontal advancing movements of the transfer plate 24 may be varied by varying the length of its supporting chains 25, 26 and 27, 28 and the system can thus be adjusted for specific installations, in which the conveyors 20 and 106 are offset laterally by different distances. Similarly, the vertical components of the movement of the plate 24 may be varied by varying the diameter of the sprocket wheels, about which the supporting chains are trained, to meet the requirements of installations, in which the conveyor 20 and the pick-up station formed by rolls 22 are offset vertically varying distances from the transfer station formed by the supports 59, 60 and from the plate 61 and conveyor 106. In the system illustrated (FIG. 2), the level of the pick-up station at the top of the rolls 22 lies considerably below the level of the upper stretch of the chains 26, 28, so that the transfer plate raises a tray a substantial distance above the pick-up station. The transfer station may then be at the same level as the pick-up station or at a higher level as desired. Similarly, it is possible to place the pick-up station at a higher level than the transfer station, if local conditions so require.

I claim:

1. In a conveying system, a combination of a pick-up station, a conveyor for advancing a series of carriers, each carrying an array of articles, and depositing the carriers successively at said pick-up station, a transfer member operable to engage said carriers successively at said pick-up station, a transfer station, a carrier return conveyor, means for moving said transfer member upwardly, laterally and then downwardly so as simultaneously (a) to transport a loaded carrier laterally from said pick-up station to and deposit it at said transfer station, and (b) to carry another carrier from said transfer station and deposit it upon said carrier return conveyor, an article conveyor leading from said transfer station, and means at said transfer station for moving an array of articles laterally from a carrier which is at said transfer station onto said article conveyor.

2. In a conveying system, the combination of claim 1, which includes guides at said transfer station for maintaining each array of articles against disarrangement as the array is moved from a carrier at the transfer station to the article conveyor.

3. In a conveying system, the combination of a pick-up station, a conveyor for advancing a series of carriers, each carrying an array of articles, and depositing the carriers successively at said pick-up station, a transfer member operating to pick up the carriers successively at said pick-up station, a transfer station, a carrier return conveyor, means for moving said transfer member so as simultaneously (a) to transport a loaded carrier from said pick-up station to and deposit it at said transfer station and (b) to carry another carrier from said transfer station and deposit it upon said carrier return conveyor, an article conveyor leaving from said transfer station, a pusher at said transfer station for engaging one side of an array of articles at the transfer station and for moving this array from a carrier at said transfer station to said article conveyor, guides at said transfer station, and means for moving said guides into contact with opposite sides of an array lying parallel to the path of movement of said pusher for maintaining each array of articles against disarrangement as the array is moved from a carrier at said transfer station to said article conveyor.

4. In a conveying system, the combination of claim 3, in which fluid-operated means move said guides into and out of operative position.

5. In a conveying system, the combination of claim 4, in which means actuated by said transfer member moving means start the fluid-operating means for moving the guides.

6. In a conveying system, the combination of claim 3, in which the pusher is moved by fluid-operated means, and means actuated by said transfer member moving means start the fluid-operated means for moving the pusher.

7. In a conveying system, the combination of claim 6, which includes means operable by one of said guides when in effective position to render the starting means operative.

8. In a conveying system, the combination of claim 1, in which said transfer member moving means operate to move said member in a closed cyclical path, in which the horizontal extent is substantially equal to the horizontal distance between said pick-up station and said transfer station.

9. In a conveying system, the combination of claim 1, in which said transfer member moving means include pairs of endless chains, with the member connected to and lying between the chains of each pair.

10. In a conveying system, the combination of claim 1, in which the transfer station is offset laterally from the pick-up station and at a different level, and the horizontal components of the movement of said transfer member extend between the stations and the vertical components extend between the levels of said pick-up and said transfer stations; and in which the transfer member is moved in such manner as to maintain the carriers substantially horizontal throughout this transfer movement.

11. In a conveyor system, the combination of claim 1, in which the movements of each carrier to and from said transfer station include vertical components while each carrier is substantially at this station, in which said means at said transfer station for moving an array of articles laterally from a carrier comprise pusher means, and further comprising means for vertically moving said pusher means to permit of the vertical movements of said carriers in moving them to and from said transfer station.

12. In a conveying system, the combination of claim 1, in which the pick-up station is formed by spaced parallel rolls and the transfer member has spaced end sections, one adapted to be moved between the carrier advancing conveyor and one roll and the other adapted to be moved between the rolls.

13. In a conveying system, the combination of claim 1, in which the transfer station includes a pair of supports for holding a carrier from beneath and accurately positioning it, and a stationary flat plate extending laterally from one support with its upper surface in the plane of the top of a carrier at the station and substantially abutting one edge thereof, whereby the array of articles brought to the transfer station on each carrier may be slid laterally therefrom at least onto said flat plate without substantial disarrangement thereof or injury to the articles.

14. In a conveyor system, the combination in accordance with claim 3, further comprising means for actuating said guide moving means after a carrier with an array thereon has arrived at the transfer station, and safety interlock means to prevent the one of said guides, which is in the rear from the point of view of the movement of said carrier to said transfer station, from moving into engagement with the adjacent side of an array of articles on the carrier at the transfer station until this carrier has been moved fully to a predetermined desired position therefor at said transfer station.

15. In a conveyor system, the combination in accordance with claim 3, further comprising interlocking means to prevent movement of said pusher until the one of said guides which is adapted to engage the rear side of an array, considered from the point of view of the direction of movement of a carrier to said transfer station, is moved fully to its article guiding position, so that disarrangement of some of the articles of said array which will prevent this guide moving to its article guiding position is effective to prevent operation of said pusher means.

16. In a conveyor system, the combination of claim 1, further comprising interlocking means, subject to the presence of articles of said article conveyor at a place where the articles of another array is normally to be moved, for preventing the operation of the article moving means at said transfer station for moving a next array of articles from a carrier onto said article conveyor.

References Cited in the file of this patent

UNITED STATES PATENTS

| | | |
|---|---|---|
| 1,729,671 | Bell-Irving et al. | Oct. 1, 1929 |
| 1,933,225 | Smith | Oct. 31, 1933 |
| 2,715,973 | Winfree et al. | Aug. 23, 1955 |
| 2,835,370 | Warrington | May 20, 1958 |
| 2,975,920 | Reed et al. | Mar. 21, 1961 |
| 3,019,925 | Gray | Feb. 6, 1962 |